Aug. 22, 1961  D. BIERMANN  2,997,111
PROPELLER UTILIZING FRACTURED BEARING
Filed Nov. 26, 1958  3 Sheets-Sheet 1
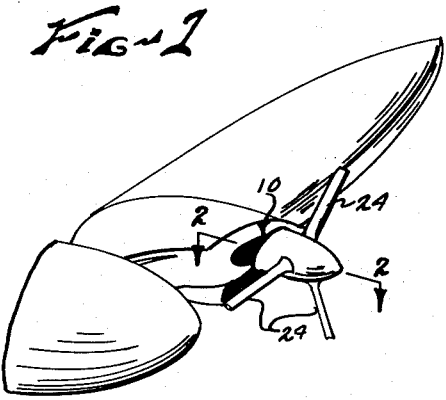
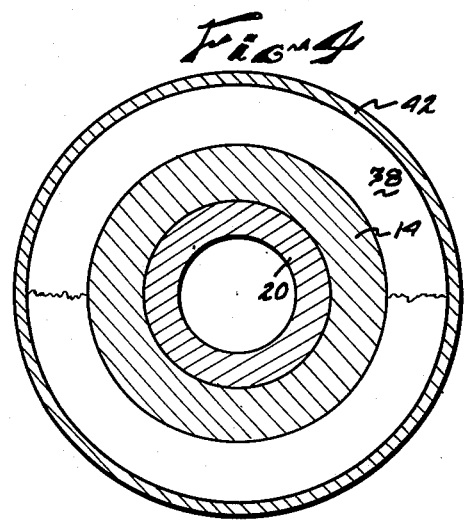
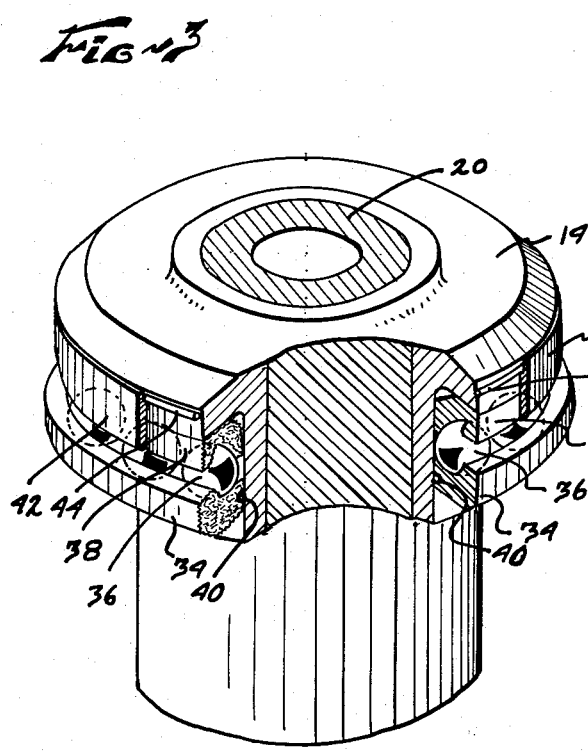
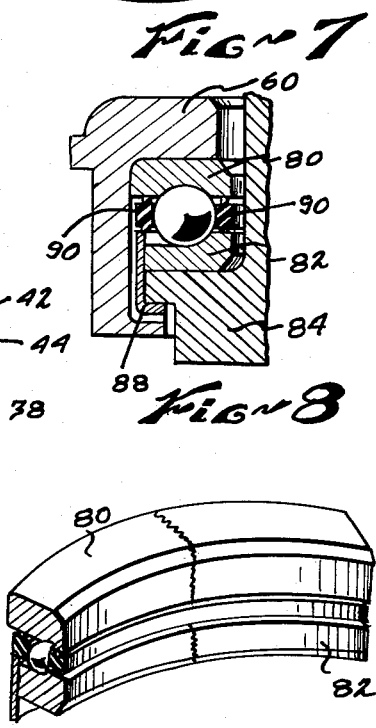
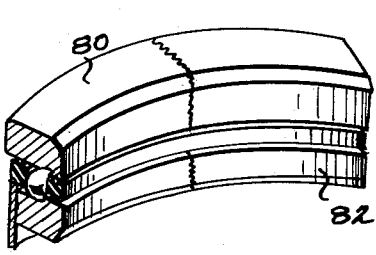
INVENTOR.
DAVID BIERMANN
BY *Toulmin & Toulmin*
ATTORNEYS

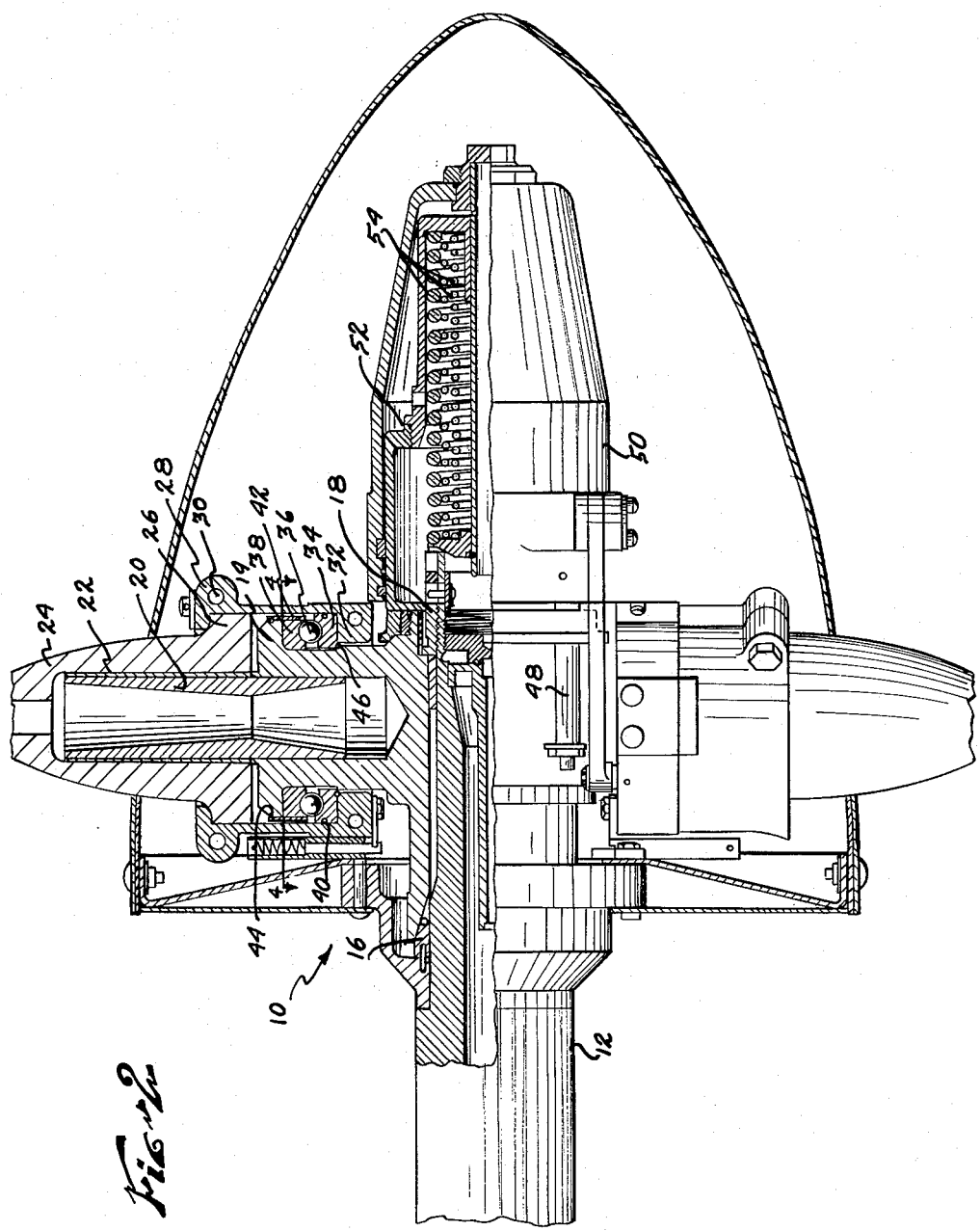

Aug. 22, 1961     D. BIERMANN     2,997,111
PROPELLER UTILIZING FRACTURED BEARING
Filed Nov. 26, 1958     3 Sheets-Sheet 3
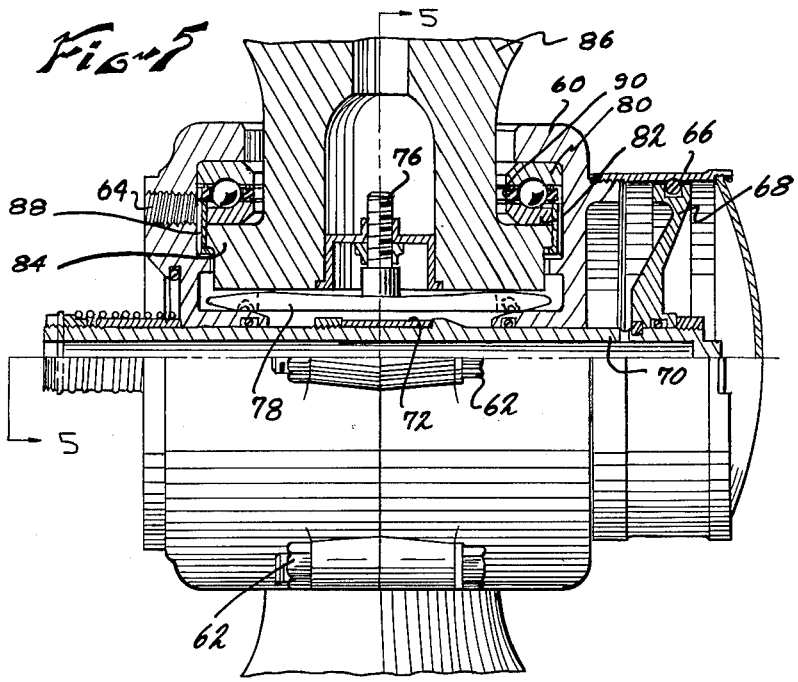
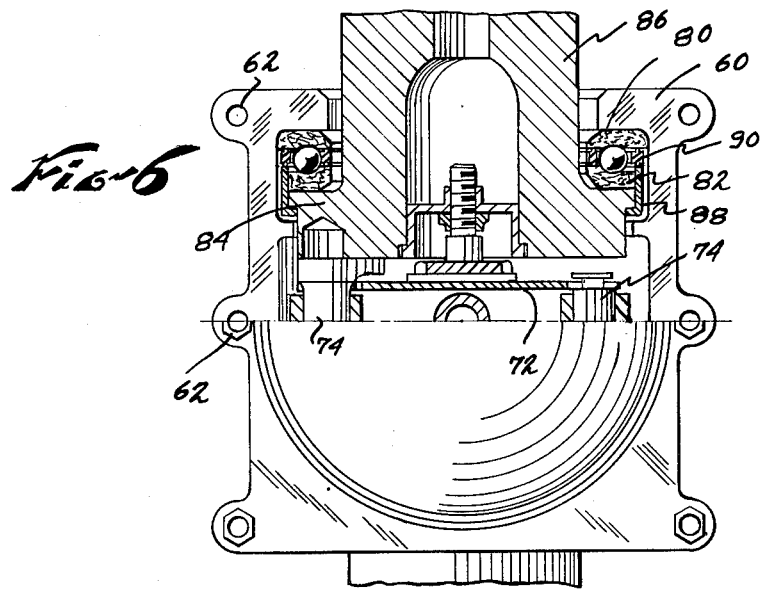
INVENTOR.
DAVID BIERMANN
BY Toulmin & Toulmin
ATTORNEYS United States Patent Office 2,997,111
Patented Aug. 22, 1961

2,997,111
PROPELLER UTILIZING FRACTURED BEARING
David Biermann, Piqua, Ohio, assignor to Hartzell Propeller, Inc., Piqua, Ohio, a corporation of Ohio
Filed Nov. 26, 1958, Ser. No. 776,583
3 Claims. (Cl. 170—160.58)

This invention relates to propellers and the method of making propellers, and is particularly concerned with the use of a fractured bearing in propeller construction.

Most propellers for airplanes are of the type in which the blades are supported in the hub of the propeller for rotation about the blade axis to change the pitch of the propeller to meet varying flight conditions, for take off, for feathering the propeller, and the like. Such propellers are generally referred to as constant speed propellers with means being provided to adjust the propeller pitch to maintain the driving engine speed substantially constant while the plane is in flight.

These propellers generally have the propeller blades supported in the hub by anti-friction bearings so that the adjustment of the propeller pitch can be made accurately and with the smallest possible forces. Heretofore, the propeller construction has been relatively complex in order to get the anti-friction bearing inserted between the inner ends of the propeller blades and the propeller hubs while at the same time providing for a strong enough structure that the propeller would hold up when being rotated. This usually involved the provision of threaded portions on the blade hubs or split collars secured to the shanks thereof, or like devices, all tending to make the propeller more bulky about the hub, heavier, and more costly to construct and maintain.

In other cases, it has been attempted to place the anti-friction bearing about the hub end of the blade and then forge the hub end of the blade outwardly thereby eliminating the devices referred to above attached to the hub end of the blade. The operation wherein the hub end of the blade is forged after the bearing is put in place, however, introduces the possibility of damaging the bearing during the working of the propeller blade, or the overheating of the bearing, or getting dirt into the bearing. This arrangement also results in a propeller construction which is not easily serviced since there is no way of replacing the anti-friction bearing once the propeller hub has been forged outwardly at its inner end.

Having the foregoing in mind, it is a primary object of the present invention to provide an improved propeller construction that eliminates threaded members and split collars and the like at the hub end of the propeller blade for retaining an anti-friction bearing thereon.

Another object of this invention is the provision of an improved construction utilizing an anti-friction bearing between the propeller blade and the hub in which the bearing is retained directly between the hub and the blade without the use of any extra fastening devices.

A particular object of this invention is the provision of a propeller and a method of making the propeller in which a fractured bearing is employed and which bearing is so supported in the hub and on the blade as to provide accurate anti-friction support of the propeller blade while eliminating all fastening devices for the bearing from the blade.

These and other objects and advantages will become more apparent upon reference to the accompanying drawings, in which:

FIGURE 1 is a more or less diagrammatic perspective view of a propeller adapted for having the present invention embodied therein, FIGURE 2 is a section through the propeller of FIGURE 1 and is indicated by line 2—2 on FIGURE 1, FIGURE 3 is a perspective view showing the fractured bearing arrangement of FIGURES 1 and 2 at enlarged scale, FIGURE 4 is a sectional view indicated by line 4—4 on FIGURE 2, FIGURE 5 is a view showing a modified arrangement, FIGURE 6 is a sectional view indicated by line 6—6 on FIGURE 5, FIGURE 7 is a sectional view drawn at enlarged scale showing the bearing arrangement of FIGURES 5 and 6, and FIGURE 8 is a perspective sectional view showing the bearing arrangement of FIGURES 5 and 6 indicating the joining together of the fractured races.

Referring to FIGURES 1, 2, and 3 more in detail, the propeller comprises a hub portion generally indicated at 10 which is drivingly attached to the drive shaft 12 of the driving engine. The propeller in FIGURES 1 and 2 has a hub spider 14 rigidly fixed to the drive shaft 12 as by the tapered cone 16 and hub nut 18 which clamps the spider against the cone. Each leg of the spider is centrally bored and supports a pilot tube 20 having a bushing 22 thereon that extends into a bore at the hub end of blade 24. Blade 24 has its lower end flanged outwardly as at 26 and it is engaged by the split clamping collar 28 which is fastened together by bolts 30.

The lower end of clamping collar 28 is formed inwardly as at 32 and machined therein is a recess for receiving one race 34 of an anti-friction bearing that also includes the anti-friction elements 36 and a second race 38 that fits against a machined portion under the head of the corresponding leg of spider 14. A snap ring 40 extends about a groove in race 34 and there is a retainer ring 42 extending about the periphery of race 38 and also about the periphery of the pertaining leg of the spider. This ring may be held in place by snap ring 44 on the leg of the spider.

A resilient rubber-like seal ring may be provided at 46 for sealing the space in which the anti-friction bearing is located.

Rotation of the propeller blades may be accomplished by the links 48 attached thereto and also connected with a piston 50 slidable on a cylinder 52. Springs 54 continuously urge the piston leftwardly while a supply of pressure fluid to the inside of shaft 12 is effective for urging the piston rightwardly. In this manner the pitch of the propeller can be adjusted with all of the blades turning on their axes simultaneously and like amounts.

According to the present invention, the anti-friction bearing is of the fractured type, which is to say, the bearing is completely manufactured and then the races are notched or scored or otherwise weakened at their sides in predetermined regions, usually at diametrically opposite points, and the races are then broken at the weakened points. This permits the races to be placed about spider 14 and when the fractured ends of the races are brought together, perfect alignment of the separate parts of each race will be had so that the bearing when reassembled is the substantial equivalent of what it was before the fracturing of the races took place.

It will be evident that the machining of the spider 14 and the collar 28 is critical so that the races will be accurately supported in their reassembled condition whereby the separate parts of each race will not tend to shift relative to each other.

Furthermore, the ring 42 is so constructed that it will press over the outer end of the spider and the two parts of the upper race thus securing the two parts of the race in position. With the bearing assembled in the manner referred to, the upper race engages only the spider, and the lower race engages only the collar 28, so that the blade can rotate without chafing any part of the highly stressed spider member 14.

The described arrangement permits assembling of the propeller blade and hub in such a manner that the blade is retained positively on the hub with substantial thicknesses of the metal of the propeller, retaining collar, and hub in overlapping relation, thus greatly increasing the strength of the assembled unit. At the same time, all split collars, other than retaining collar 28, are eliminated, and the hub and propeller blade are free of expensive threads, and the like, which heretofore have been employed for the purpose of attaching, bearing, locating, and retaining elements to the blade or hub, or to both thereof.

The net result is a propeller more compact than has previously been manufactured, due to the elimination of the bearing retaining elements within the hub, a strong propeller structure, and one which can be more readily manufactured and assembled and serviced.

Another type of propeller structure adapted for being manufactured according to the present invention is illustrated in FIGURES 5 and 6.

In these figures the hub 60 is itself split transversely with the two parts being bolted together by bolts 62 and the one hub portion being adapted for being bolted at 64 to a flange on the end of the engine driving shaft, and the other hub portion carrying a cylinder 66 in which there is a piston 68 connected by tube 70 with a cross head 72 that is connected with the propeller blades by the eccentric pins 74 so that reciprocation of the tube and cross head will cause the blades to rotate about their axes. Each blade has a screw 76 that bears on a loading plate 78 that holds the propeller blade outwardly when the propeller is not rotating.

The anti-friction bearing of the FIGURES 5 and 6 modification is of the angular contact type so that it will support both axial and radial loads. One race of the bearing is indicated at 80 and fits a machined recess in hub 60. The other race of the bearing at 82 engages the forged and machined inner end portion 84 of the propeller blade 86. A ring 88, corresponding with ring 42 of the first modification, is pressed upwardly over portion 84 of the propeller blade and about the race 82 of the bearing. The bearing races in the FIGURES 5 and 6 modification are of the fractured type similar to the one previously described. The same advantages obtain for the propeller construction of FIGURES 5 and 6, in that the propeller is extremely compact, consists of the fewest possible parts, is extremely strong, and can readily be serviced.

The angular contact bearing of the FIGURES 5 and 6 modification is employed because there is no pilot arrangement as in the propeller construction of FIGURE 2 to sustain bending loads imposed on the propeller blade. The angular contact bearing of FIGURES 5 and 6 is adapted to sustain both the centrifugal loading on the propeller blades and also the bending forces imposed thereon. With reference to FIG. 7 showing the angular contact bearing in greater detail, it is seen that the two races are so placed and shaped that the center of the race contact area of each anti-friction element is on an angle to both the longitudinal axis of the propeller blade and a plane normal to said axis. By this arrangement, the center of the contact area tends to be in line with the resultant force vector from the combination of the axial and radical forces.

In the FIGURES 5 and 6 modification, the hub is of such a size that when it is bolted together, it clamps the two parts of race 80 of the bearing tightly together, thus locating the two parts relative to each other, and supporting the two parts and preventing slipping of the outer race within the hub.

The ring 88 pressed on the inner end of blade 86 provides the same function in connection with the parts of race 82 of the bearing.

It will be noted, particularly in FIGURE 6, that ring 88 extends upwardly somewhat past the race 82 and engages the resilient ring 90 located between the races. Ring 90 is by way of being seal ring and ball spacer and lubricant retainer and provides an inexpensive but highly effective means of prolonging the service life of the ball bearing. Since ring 90 is a resilient material, it can be stretched over the flanged out inner end of the hub and does not need to be split to assemble the bearing on the hub. None of the sealing efficiency of the ring is lost, therefore, in the practice of the present invention.

It is to be understood, however, that this ring could be split, if necessary, and the ends thereof would be retained in engagement with each other by the balls of the bearing. The use of the seal ring eliminates the need for expensive seals at the mouth of the blade opening in the hub or about the blade end inwardly of the bearing.

It will be understood that this invention is susceptible to modification in order to adapt it to different usages and conditions, and accordingly, it is desired to comprehend such modifications within this invention as may fall within the scope of the appended claims.

I claim:

1. In a propeller, a hub having a blade socket, an internal flange about the mouth of said blade socket, a propeller blade having a butt end positioned within said blade socket, an external flange on said butt end of the propeller blade, anti-friction bearing means comprising split outer and inner bearing races positioned in said blade socket with said outer race engaging the inner surface of said socket and the underside of said socket internal flange and said inner race engaging the upper side of said blade external flange, a plurality of anti-friction bearing elements disposed between said races, said races being shaped and positioned that the contact area of each describe elements of a cone, said outer and inner races being spaced from said propeller blade to provide a clearance, ring means located between said races to provide a spacer and lubricant retainer for said anti-friction bearing elements, a race retaining ring mounted on the external flange of said propeller blade and clamping tightly around said inner race whereby the two halves of the split inner race are pressed firmly together and said anti-friction elements are adapted to roll across said split away portion without chafing the edges thereof, said anti-friction bearing elements being of an angular contact type for transmitting radial and axial loads and said bearing races being shaped so that the lines of contact as determined by the points of contact of said anti-friction bearing elements within said races describe elements of a cone.

2. In a propeller, a hub having a blade socket, an internal flange about the mouth of said blade socket, a propeller blade having a butt end positioned within said blade socket, an external flange on said butt end of the propeller blade, said blade socket internal flange overlapping said external flange of said blade, anti-friction ball bearing means comprising split outer and inner bearing races positioned in said blade socket with said outer race engaging the inner surface of said socket and the underside of said socket internal flange and said inner race engaging the upper side of said blade external flange, a plurality of anti-friction ball bearings disposed between said races, said races being shaped and positioned that the contact area of each describe elements of a cone, said outer and inner races being spaced from said propeller blade to provide a clearance, ring means located between said races to provide a spacer and lubricant retainer for said anti-friction bearing elements, a race retaining ring mounted on the external flange of said propeller blade and clamping tightly around said inner race whereby said split outer and inner races are pressed firmly together and said ball bearings are adapted to roll across the split away portion without chafing the edges thereof, said ball bearings being of an angular contact type for transmitting radial and axial loads and said bearing races being shaped so that the lines of contact as determined by the points of contact of said ball bearings with said races describe elements of a cone.

3. In a propeller, a hub having a blade socket, an internal flange about the mouth of said blade socket, a propeller blade having a butt end positioned within said blade socket, an external flange on said butt end of the propeller blade, anti-friction bearing means comprising split outer and inner bearing races positioned in said blade socket with said outer race engaging the inner surface of said socket and the underside of said socket internal flange and said inner race engaging the upper side of said blade external flange, a plurality of anti-friction bearing elements disposed between said races, said races being shaped and positioned that the contact area of each describe elements of a cone, said outer and inner races being spaced from said propeller blade to provide a clearance, a resilient ring located between said races to provide a spacer and lubricant retainer for said anti-friction bearing elements, a race retaining ring mounted on the external flange of said propeller and clamping tightly around said inner race whereby said split outer and inner races are pressed firmly together and said anti-friction elements are adapted to roll across said split away portion without chafing the edges thereof, a snap ring engaging around said external flange and securing said race retaining ring in place, said anti-friction bearing elements being of an angular contact type for transmitting radial and axial loads and said bearing races being shaped so that the lines of contact as determined by the points of contact of said anti-friction bearing elements with said races describe elements of a cone.

References Cited in the file of this patent

UNITED STATES PATENTS

| | | |
|---|---|---|
| 2,248,590 | Smith | July 8, 1941 |
| 2,625,998 | Berninger et al. | Jan. 20, 1953 |
| 2,704,129 | Cushman | Mar. 15, 1955 |
| 2,722,985 | Biermann | Nov. 8, 1955 |